United States Patent
Hirukawa et al.

(10) Patent No.: US 12,027,689 B2
(45) Date of Patent: Jul. 2, 2024

(54) METHOD FOR PRODUCING ELECTRODE

(71) Applicant: TOYOTA JIDOSHA KABUSHIKI KAISHA, Toyota (JP)

(72) Inventors: Tomofumi Hirukawa, Toyota (JP); Kengo Haga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 17/817,407

(22) Filed: Aug. 4, 2022

(65) Prior Publication Data

US 2023/0079146 A1 Mar. 16, 2023

(30) Foreign Application Priority Data

Sep. 2, 2021 (JP) .................................. 2021-142874

(51) Int. Cl.
*H01M 4/04* (2006.01)
*H01M 4/66* (2006.01)
*H01M 4/02* (2006.01)

(52) U.S. Cl.
CPC ....... *H01M 4/0435* (2013.01); *H01M 4/0404* (2013.01); *H01M 4/661* (2013.01); *H01M 2004/021* (2013.01)

(58) Field of Classification Search
CPC ..................................................... H01M 4/04
See application file for complete search history.

(56) References Cited

U.S. PATENT DOCUMENTS

2018/0226630 A1* 8/2018 Yanai ........................ B30B 3/00
2020/0368818 A1* 11/2020 Kubo ................ H01M 10/0585
(Continued)

FOREIGN PATENT DOCUMENTS

JP 2008-226502 * 9/2008
JP 2012-79592 * 4/2012
(Continued)

OTHER PUBLICATIONS

AZO Materials data sheet (accessed Nov. 22, 2023).*
Machine translation of document N.*
Machine translation of document O.*

*Primary Examiner* — Austin Murata
(74) *Attorney, Agent, or Firm* — Dickinson Wright, PLLC

(57) ABSTRACT

A main object of the present disclosure is to provide a method for producing an electrode of which uncoated part can stretch while inhibiting breakage. The present disclosure achieves the object by providing a method for producing an electrode, the method including: a preparing step of preparing a precursor sheet including a metal foil, and a coated part and an uncoated part, arranged on the metal foil; a coated part pressing step of pressing the coated part in a thickness direction; and an uncoated part pressing step of pressing the uncoated part in the thickness direction, before or after the coated part pressing step; wherein the coated part contains an electrode material including at least an active material; the uncoated part does not contain the electrode material, and is arranged in an edge of the coated part; and in the uncoated part pressing step, the uncoated part is roll-pressed by a pair of an elastic roll including a shaft body and an elastic body covering the shaft body, while the uncoated part is pushed against the thickness direction.

3 Claims, 5 Drawing Sheets

(56) References Cited

U.S. PATENT DOCUMENTS

2021/0288302 A1\* 9/2021 Jamadar .............. H01M 4/0404
2022/0140308 A1\* 5/2022 Nishida ................ H01M 4/131
                                                           429/223

FOREIGN PATENT DOCUMENTS

| JP | 2014220113 A | 11/2014 |
| JP | 5760366 B2 | 8/2015 |
| JP | 2019102172 A | 6/2019 |

\* cited by examiner

METHOD FOR PRODUCING ELECTRODE

TECHNICAL FIELD

The present disclosure relates to a method for producing an electrode.

BACKGROUND

As a method for producing an electrode, a method of rolling a sheet formed by pasting an electrode mixture on a long metal foil, has been known.

For example, Patent Literature 1 discloses a method for pressing an electrode for battery comprising a coated part on which an electrode active material is pasted, and an uncoated part on which an electrode active material is not pasted. Patent Literature 2 discloses a method in which only an uncoated part of an electrode material with tensile stress applied between guide rolls is stretched by a pressing roll, and then the electrode material is roll-pressed. Patent Literature 3 discloses a roll-pressing method using a roll-pressing machine comprising a wrinkle generation inhibiting device, which prevents wrinkles from generating in a coated part and an uncoated part of an electrode plate in a roll-pressing operation.

CITATION LIST

Patent Literatures

Patent Literature 1: Japanese Patent (JP-B) No. 5760366
Patent Literature 2: Japanese Patent Application Laid-Open (JP-A) No. 2014-220113
Patent Literature 3: JP-A No. 2019-102172

SUMMARY OF DISCLOSURE

Technical Problem

As described above, on the occasion of pressing a sheet including a coated part and an uncoated part, to avoid generating wrinkles, the coated part and the uncoated part may be separately pressed to adjust elongation difference. On this occasion, breakage may be generated in the uncoated part positioned in the edge of the sheet.

The present disclosure has been made in view of the above circumstances, and a main object thereof is to provide a method for producing an electrode of which uncoated part can stretch while inhibiting breakage.

Solution to Problem

In order to achieve the object, the present disclosure provides a method for producing an electrode, the method including: a preparing step of preparing a precursor sheet including a metal foil, and a coated part and an uncoated part, arranged on the metal foil; a coated part pressing step of pressing the coated part in a thickness direction; and an uncoated part pressing step of pressing the uncoated part in the thickness direction, before or after the coated part pressing step; wherein the coated part contains an electrode material including at least an active material; the uncoated part does not contain the electrode material, and is arranged in an edge of the coated part; and in the uncoated part pressing step, the uncoated part is roll-pressed by a pair of an elastic roll including a shaft body and an elastic body covering the shaft body, while the uncoated part is pushed against the thickness direction.

According to the present disclosure, the uncoated part is roll-pressed using the specified elastic roll, and thus the uncoated part can stretch while inhibiting breakage.

In the disclosure, a compression Young's modulus of the elastic body may be 11.1 MPa or more and 86.1 MPa or less.

In the disclosure, the compression Young's modulus of the elastic body may be 20 MPa or more.

In the disclosure, when T1 designates a thickness of the elastic body and T2 designates a thickness of the coated part, T1/T2 may be 4 or more.

In the disclosure, the uncoated part pressing step may be performed while applying a tensile force of 100 N or less.

Advantageous Effects of Disclosure

The present disclosure exhibits an effect such that the uncoated part can stretch while inhibiting breakage.

DESCRIPTION OF EMBODIMENTS

The method for producing the electrode in the present disclosure will be hereinafter described in details. Here, in the present description, upon expressing an embodiment of arranging one member with respect to the other member, when it is expressed simply "on", both of when the other member is directly arranged on the one member so as to contact with each other, and when the other member is arranged above the one member interposing an additional member, can be included unless otherwise described.

Figure 1:
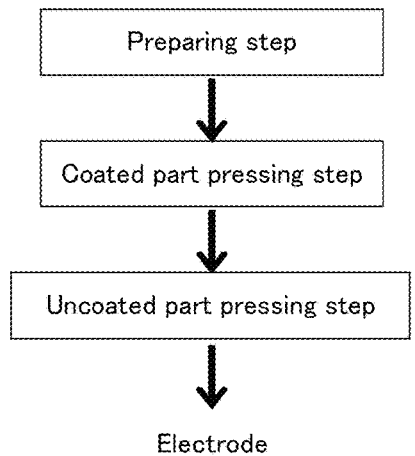
FIG. 1 is a flow chart illustrating an example of the method for producing the electrode in the present disclosure.

FIG. 1 is a flow-chart illustrating an example of the method for producing the electrode in the present disclosure. In FIG. 1, first, a precursor sheet including a metal foil, and a coated part and an uncoated part, arranged on the metal foil, is prepared (preparing step). The coated part contains an electrode material including at least an active material. Also, the uncoated part does not contain the electrode material, and is arranged in an edge of the coated part. Next, the coated part is pressed in a thickness direction (coated part pressing step). Then, the uncoated part is pressed in the thickness direction (uncoated part pressing step). Incidentally, in FIG. 1, the uncoated part pressing step is performed after the coated part pressing step, but may be performed before the coated part pressing step. Also, in the uncoated part pressing step, the uncoated part is roll-pressed by a pair of an elastic roll including a shaft body and an elastic body covering the shaft body, while the uncoated part is pushed against the thickness direction.

According to the present disclosure, the uncoated part is roll-pressed by the specified elastic roll, and thus the uncoated part can stretch while inhibiting breakage.

In Patent Literature 2, the uncoated part is stretched by pushing a roll with steps against one surface of the uncoated part, and only the tensile force for stretching is applied to the uncoated part. With such a method, although the uncoated part can be stretched, it may be broken (refer to FIG. 2B). Also, in Patent Literature 3, the uncoated part of the electrode mixture is stretched by a roll structure. As described in Comparative Example 2 later, the uncoated part cannot be effectively stretched by a method of applying only pressing pressure (compression force).

On the other hand, with the method for producing the electrode in the present disclosure, the uncoated part is roll-pressed by the specified elastic roll, and thus the compression force and deformation force caused by the deformation of the elastic body can be applied to the same point of the uncoated part. As a result, generation of voids is inhibited, and thus the uncoated part can stretch while inhibiting breakage.

Figure 2A:
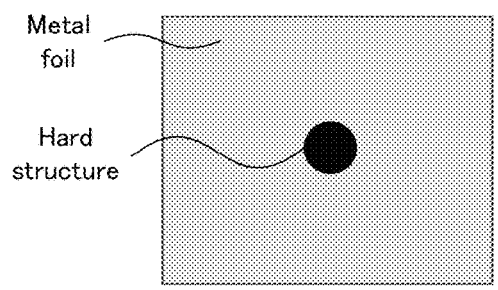
FIGS. 2A to 2C are drawings explaining the mechanism in the present disclosure.
Figure 2C:
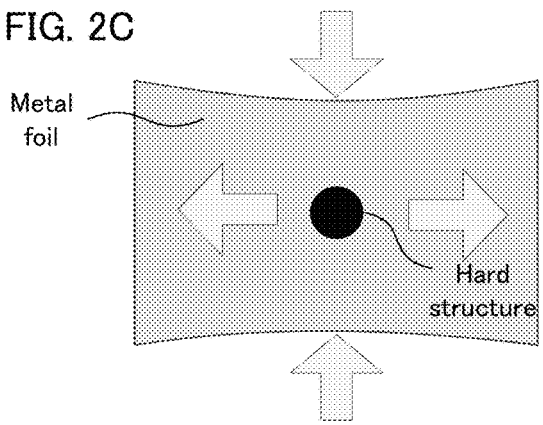
Figure 2B:
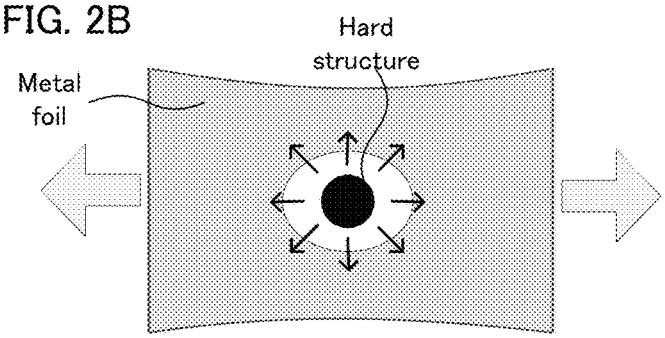

The mechanism in the present disclosure will be explained with reference to drawings. FIG. 2A is a diagram illustrating a general metal foil. As shown in FIG. 2A, as an inclusion, a hard structure that is harder than the material of a metal foil is generally included in the metal foil. With the inclusion of the hard structure, for example, strength of the metal foil can be improved. When a tensile force (force in left and right direction of the drawing) is applied to stretch the metal foil, the hard structure is not deformed, but the surrounding of the metal foil that is softer than the hard structure is deformed. As a result, as shown in FIG. 2B, voids are formed in the surrounding of the hard structure. Then, when several voids are connected, breakage occurs. On the other hand, with the method for producing the electrode in the present disclosure, as shown in FIG. 2C, the compression force and the deformation force of the elastic body can be applied locally to the metal foil. As a result, it is presumed that the generation of voids in the surrounding of the hard structure is inhibited. Also, even if voids are generated, it is presumed that the expansion of the voids can be inhibited by the compression force. Here, the deformation force of the elastic body works in the same direction as the tensile force (right and left direction of FIG. 2), and it is a force of stretching the metal foil similarly to the tensile force. Meanwhile, the deformation force is applied to a part where the elastic body contacts the metal foil (uncoated part) as described layer, and thus it is presumed that, the force can be applied more locally compared to, for example, the tensile force applied by a tensile force applying device.

Figure 3:
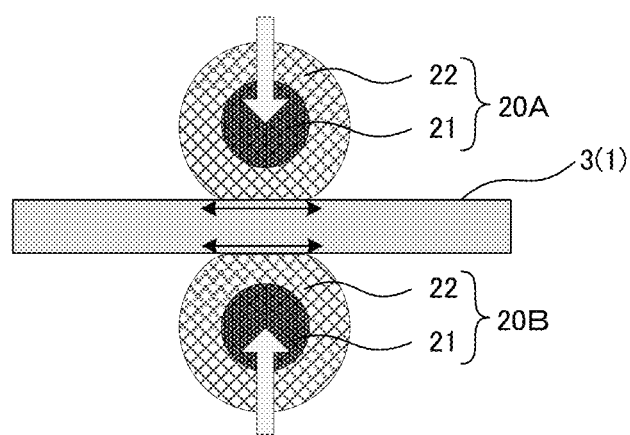
FIG. 3 is a drawing explaining the mechanism in the present disclosure.

Next, the mechanism in the present disclosure will be explained with reference to a diagram of the elastic roll in the present disclosure. As shown in FIG. 3, uncoated part 3 (metal foil 1) contacts elastic body 22 in a pair of elastic rolls 20 (A, B) during roll-pressing. The pair of elastic rolls 20 (A, B) are pushed against the uncoated part from the thickness direction of the precursor sheet, and thus the compression force (force from up and down direction of the drawing) can be applied. Also, the elastic body 22 of the elastic rolls 20 (A, B) has elasticity, and thus the elastic body 22 is deformed by the compression force, and the deformation force (force to left and right direction of the drawing) can be applied to the uncoated part 3 which contacts the elastic body 22. In this manner, by using the elastic roll of the present disclosure, both of the compression force and the deformation force of the elastic body can be applied to the same part of the uncoated part. Thereby, the uncoated part can stretch while inhibiting breakage. Further, with the method for producing the electrode in the present disclosure, the force to stretch the uncoated part can be covered by the deformation force of the elastic body, and thus the uncoated part can be stretched without arranging an additional device such as the tensile force applying device, and miniaturization of the production facility is also possible.

1. Preparing Step

The preparing step in the present disclosure is a step of preparing a precursor sheet including a metal foil, and a coated part and an uncoated part, arranged on the metal foil.

The precursor sheet to be prepared in the preparing step includes a metal foil, a coated part, and an uncoated part.

Examples of the material for the metal foil may include metals used as the materials for current collectors of a battery. Details will be described in "4. Electrode". The thickness of the metal foil is, for example, 1 μm or more and may be 10 μm or more. Meanwhile, the thickness of the metal foil is, for example, 100 μm or less.

The coated part of the precursor sheet contains an electrode material including at least an active material. Also, the coated part is arranged on the metal foil. The coated part will be an electrode layer through the later described coated part pressing step.

The electrode material contains at least an active material. Also, the electrode material may contain at least one of a solid electrolyte, a conductive material, and a binder, as required. The active material, the conductive material, and the binder will be described in "4. Electrode".

The coated part may be, in the thickness direction, arranged on just a first surface of the metal foil, and may be arranged on both the first surface and a second surface that is opposite side surface to the first surface.

The coated part is preferably arranged in the longer direction (conveying direction) of the metal foil.

The thickness of the coated part is not particularly limited, and may be appropriately adjusted depending on the desired electrode size. The thickness of the coated part is, for example, 0.2 mm or more, may be 0.3 mm or more, and may be 0.5 mm or more. Meanwhile, the thickness of the coated part is, for example, 1.5 mm or less, may be 1.0 mm or less, and may be 0.6 mm or less.

The width of the coated part (length of the metal foil in the direction orthogonal to the longer direction) is not particularly limited, and may be appropriately adjusted depending on the desired electrode size. The rate of the width of the coated part with respect to the width of the metal foil is, for example, 30% or more, may be 50% or more, and may be 70% or more. Also, the rate is, for example, 90% or less and may be 80% or less.

The uncoated part does not contain the electrode material, and is arranged in an edge of the coated part. The uncoated part may be arranged in just one edge of the coated part, and may be arranged in both edges of the coated part. Also, in the metal foil, the uncoated part may be arranged in just one edge in the direction orthogonal to the longer direction of the metal foil, and may be arranged in the both edges.

The uncoated part is arranged on the metal foil. Also, the uncoated part is usually arranged on the same surface of the metal foil where the coated part is arranged. The uncoated part is, for example, a part where the metal foil is exposed.

The width of the uncoated part (length in the direction orthogonal to the longer direction of the metal foil) is not particularly limited, and may be appropriately adjusted depending on the desired electrode size. The rate of the width of the uncoated part with respect to the width of the metal foil is, for example, 3% or more and may be 5% or more. Meanwhile, the rate is, for example, 20% or less and may be 10% or less.

Also, the rate of the width of the uncoated part with respect to the width of the coated part is, for example, 20% or more and may be 30% or more. Meanwhile, the rate is, for example, 50% or less.

The precursor sheet may be prepared by, for example, pasting an electrode material containing a dispersion medium on the metal foil, and drying thereof. Examples of the dispersion medium may include an organic solvent such as butyl butyrate, dibutyl ether and heptane. There are no particular limitations on the method for pasting the electrode material, and a general pasting method may be used. Also, the drying temperature is not particularly limited if the temperature allows the dispersion medium to volatilize.

Figure 4:
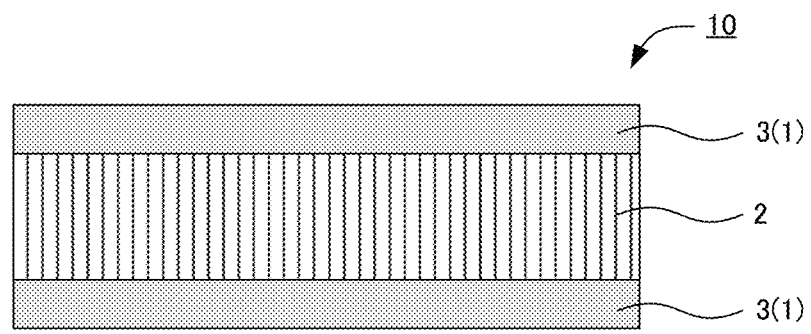
FIG. 4 is a schematic plan view illustrating an example of the precursor sheet in the present disclosure.

The precursor sheet prepared in the preparing step may be, for example, precursor sheet 10 including one line of coated part 2, and two lines of uncoated part 3 arranged in both edges of the coated part 2, in a striped shape in a plan view, as shown in FIG. 4. Also, although not illustrated, the precursor sheet may be a sheet including N lines (N is an integer of 2 or more) of the coated part, and the uncoated part arranged on both edges of each of the N lines of the coated part. In this case, the number of the lines of the uncoated part is N+1.

2. Coated Part Pressing Step

The coated part pressing step is a step of pressing the coated part in the thickness direction. The coated part pressing step may be performed before or after the later described uncoated part pressing step.

The method and conditions for the coated part pressing step are not particularly limited as long as the coated part can be pressed and stretched. Examples of the method for pressing may include a roll-pressing method of roll-pressing the coated part. For example, the coated part can be pressed by letting the precursor sheet through a pair of pressing rolls so that the pressing rolls are pushed against the both surfaces of the precursor sheet in the thickness direction.

The compression force in the coated part pressing step is not particularly limited, but it is preferably larger than the compression force in the later described uncoated part pressing step. The reason therefor is that, in the coated part of the precursor sheet, wrinkles may be generated when wet by an electrode material (slurry) containing a dispersion medium, and large stretching force is necessary for stretching the wrinkles.

3. Uncoated Part Pressing Step

The uncoated part pressing step is a step of pressing the uncoated part in the thickness direction, before or after the coated part pressing step. Also, in the uncoated part pressing step, the uncoated part is roll-pressed by a pair of an elastic roll including a shaft body and an elastic body covering the shaft body, while the uncoated part is pushed against the thickness direction.

By pressing the uncoated part, the uncoated part can be stretched to adjust the elongation difference from the coated part. Thereby, generation of wrinkles in the electrode can be inhibited. The elongation amount of the uncoated part is appropriately adjusted depending on the conditions of the coated part pressing step.

Figure 5A:
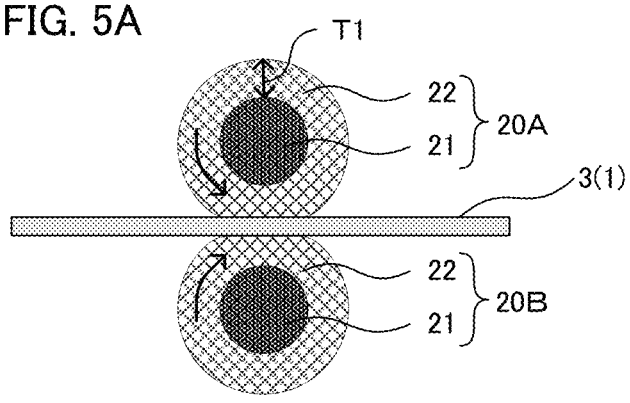
FIGS. 5A to 5C are drawings explaining the uncoated part pressing step in the present disclosure.
Figure 5C:
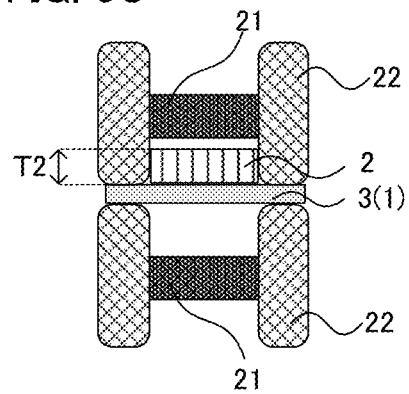
Figure 5B:
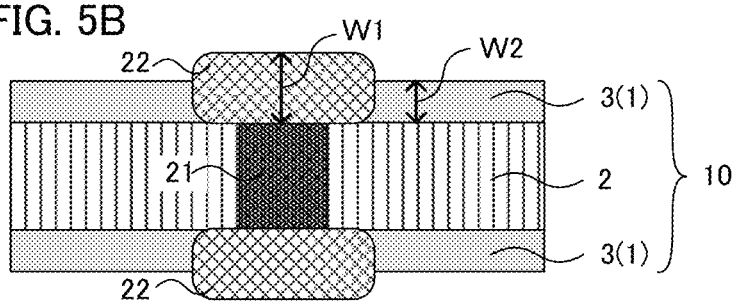

Here, the uncoated part pressing step will be explained with reference to drawings. FIG. 5A is a schematic side view of the uncoated part pressing step from the width direction of the metal foil. FIG. 5B is a schematic plan view of FIG. 5A observed from the thickness direction (up and down direction of the drawing) of the precursor sheet. FIG. 5C is a schematic front view of FIG. 5A observed from the conveying direction (left and right direction of the drawing) of the precursor sheet.

As shown in FIGS. 5A and 5C, in the uncoated part pressing step, uncoated part 3 (metal foil 1) is roll-pressed by letting the precursor sheet through between the specified pair of elastic rolls 20A and 20B so that the elastic rolls 20A and 20B are pushed against the both surfaces of the precursor sheet in the thickness direction.

The elastic roll 20 usually has a roll shape in which elastic body 22 is arranged around shaft body 21. Also, as shown in FIG. 5C, the elastic roll is so-called roll with steps, and it can press only the uncoated part. With the roll shape, the shaft body of the elastic roll bonds with the elastic body, and thus the deformation of the elastic body in the conveying direction of the precursor sheet is restrained compared to the sheet shape, and thus the compression force can be increased. Also, the deformation direction of the elastic body can be stabilized and generation of wrinkles can be further inhibited.

There are no particular limitations on the materials for the shaft body, but a material with larger compression Young's modulus than that of the elastic body is preferable. Examples of the material for the shaft body may include a metal.

There are no particular limitations on the elastic body if it has elasticity, and examples thereof may include a rubber; and a resin such as urethane.

The elastic body preferably has the specified compression Young's modulus. The compression Young's modulus is, for example, 10 MPa or more, may be 11.1 MPa or more, may be 15 MPa or more, and may be 20 MPa or more. Meanwhile, the compression Young's modulus is, for example, 90 MPa or less, may be 86.1 MPa or less, may be 60 MPa or less, may be 40 MPa or less, and may be 35 MPa or less. If the compression Young's modulus is too low, the deformation of the elastic body would be too large, and exceeding deformation force would be applied to the uncoated part. As a result, there is a risk that breakage may not be sufficiently inhibited. On the other hand, if the compression Young's modulus is too high, the elastic body would not be easily deformed, and there is a risk that the deformation force cannot be sufficiently applied to the uncoated part.

As shown in FIG. 5B, width W1 of the elastic body may be wider than width W2 of the uncoated part. W1/W2 is, for example, 1.1 or more, may be 1.2 or more, and may be 1.3 or more.

As shown in FIG. 5A and FIG. 5C, when T1 designates the thickness of the elastic body, and T2 designates the thickness of the coated part, T1/T2 is, for example, 4 or more, may be 5 or more, may be 10 or more, and may be 15 or more. Meanwhile, T1/T2 is, for example, 40 or less, may be 33.3 or less, may be 30 or less, may be 25 or less, and may be 20 or less. Incidentally, the thickness (T1) of the elastic body is typically a value obtained by subtracting the radius of the shaft body from the radius of the elastic roll.

In the present disclosure, the compression force in the uncoated part pressing step is not particularly limited, but is preferably appropriately adjusted based on the material of the elastic body to be used, the material of the metal foil, and necessary elongation amount. The compression load is, for example, 2 kgf/cm or more, may be 2.1 kgf/cm or more, may be 5 kgf/cm or more, and may be 10 kgf/cm or more. Meanwhile, the linear pressure is, for example, 40 kgf/cm or less, may be 36 kgf/cm or less, may be 30 kgf/cm or less, and may be 20 kgf/cm or less. Incidentally, the method for obtaining the compression force (linear pressure) will be described in Examples.

When the deformation force is applied to the uncoated part by the elastic roll, the uncoated part can be stretched. Therefore, in the uncoated part pressing step in the present disclosure, the tensile force can be reduced compared to when the elastic roll is not used (such as when a metal roll is used). The tensile force applied in the uncoated part pressing step is, for example, 100 N or less, may be 70 N or less, and may be 50 N or less. Meanwhile, the tensile force is, for example, 30 N or more. The tensile force may be applied by, for example, a tensile force applying device.

The uncoated part pressing step is performed before or after the coated part pressing step. In other words, the uncoated part pressing step may be: (i) performed before the coated part pressing step, but not performed after the coated part pressing step; (ii) not performed before the coated part pressing step, but performed after the coated part pressing step; and (iii) performed before the coated part pressing step, and further performed after the coated part pressing step.

4. Electrode

In the electrode to be produced by the method of the present disclosure, an electrode layer is formed on at least one surface of the metal foil. Incidentally, the electrode layer is a layer obtained by pressing the coated part. The electrode to be produced by the method of the present disclosure may be a cathode and may be an anode.

The metal foil typically works as a current collecting foil (current collector). In other words, the metal foil may be a cathode current collector, and may be an anode current collector. When the metal foil is the cathode current collector, examples of the material for the metal foil may include Al, SUS, and Ni. When the metal foil is the anode current collector, examples of the material for the metal foil may include Cu, SUS, and Ni.

The electrode layer contains at least an active material. When the electrode layer is a cathode layer, the active material is a cathode active material. Typical examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$ and $Li(Ni_{0.5}Mn_{1.5})O_4$; and an olivine type active material such as $LiFePO_4$, $LiMnPO_4$, $LiNiPO_4$, and $LiCuPO_4$.

When the electrode layer is an anode layer, the active material is an anode active material. Examples of the anode active material may include a carbon active material, an oxide active material, and a metal active material. Examples of the carbon active material may include methocarbon microbeads (MCMB), highly oriented pyrolytic graphite (HOPG), hard carbon, and soft carbon. Examples of the oxide active material may include $Nb_2O_5$, $Li_4Ti_5O_{12}$, and SiO. Examples of the metal active material may include In, Al, Si and Sn.

Also, the electrode layer may contain at least one of a solid electrolyte, a conductive material, and a binder, as required.

Examples of the solid electrolyte may include an inorganic solid electrolyte. Examples of the inorganic solid electrolyte may include a sulfide solid electrolyte, an oxide solid electrolyte, a nitride solid electrolyte, and a halide solid electrolyte. Also, the inorganic solid electrolyte preferably includes, for example, Li-ion conductivity.

Examples of the conductive material may include a carbon material, a metal particle, and a conductive polymer. Examples of the carbon material may include a particulate carbon material such as acetylene black (AB) and Ketjen black (KB); and a fiber carbon material such as carbon fiber, carbon nanotube (CNT) and carbon nanofiber (CNF). Also, examples of the binder may include a fluorine-containing binder such as polyvinylidene fluoride (PVDF) and polytetra fluoroethylene (PTFE), a rubber-based binder such as butadiene rubber, and an acrylic binder.

Examples of the applications of the electrode in the present disclosure may include a Li ion battery. Also, the battery in the present disclosure may be an all solid state battery in which the electrolyte layer contains an inorganic solid electrolyte. Also, the application of the battery in the present disclosure is not particularly limited, and examples thereof may include a power source for vehicles such as hybrid electric vehicles (HEV), plug-in hybrid electric vehicle (PHEV), battery electric vehicles (BEV), gasoline-fueled automobiles and diesel powered automobiles. In particular, it is preferably used as a power source for driving hybrid electric vehicles and battery electric vehicles. Also, the battery in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

An electrode mixture containing a dispersion medium was pasted on one surface of an aluminum foil (1N30) having a thickness of 12 μm so that the thickness became 500 μm, and dried. Thereby, precursor sheet 10 including coated part 2 and uncoated part 3 as shown in FIG. 4 was prepared.

Also, an elastic roll (roll with steps) formed by arranging an elastic body on the surface of a shaft body (50 mm diameter) was prepared. The thickness of the elastic body was 10 mm. The compression Young's modulus of the elastic body used was measured in the following manners. First, the elastic body was adjusted to the size of 10 mm by 10 mm by 10 mm. To this elastic body, an autograph was operated so that the compression deformation rate (deformation rate) became 0% to 25% to 0% in the first cycle and 0% to 25% in the second cycle, and thereby the relationship between the deformation rate and the stress was measured. The compression Young's modulus was calculated from the following formula using the stress ($\sigma_{10}$) when the deformation rate was 10% in the second cycle. The results are shown in Table 1.

Compression Young's modulus=$\sigma_{10}/0.1$

By using the prepared precursor sheet and elastic roll, the maximum elongation of the uncoated part was calculated as follows.

Figure 6A:
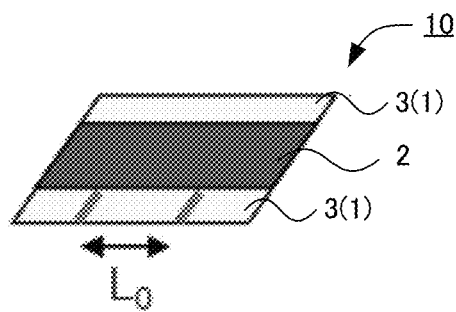
FIGS. 6A to 6C are drawings explaining the elongation measurement method in Examples and Comparative Examples.
Figure 6B:
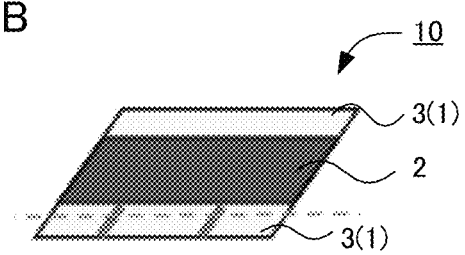
Figure 6C:

First, as shown in FIG. 6A, in the uncoated part 3 (metal foil 1) of the precursor sheet 10, two lines were drawn in arbitrary positions in the longer direction, and a length ($L_0$) between the lines before pressing was measured. Next, as shown in FIGS. 5A to 5C, the uncoated part was roll-pressed by a pair of elastic rolls, while the uncoated part was pushed against the thickness direction. Then, as shown in FIG. 6B and FIG. 6C, the uncoated part was cut out from the precursor sheet after pressing, and the length ($L_1$) between the lines after pressing was measured. The elongation (%) was calculated from the below formula. Incidentally, the uncoated part was pressed while applying the tensile force of 50 N to the precursor sheet.

Elongation=$(L_1 L_0)/L_0 * 100$

The load of pushing the elastic roll was gradually increased, and the maximum elongation when breakage did not occur was obtained as the breaking limit elongation. The results are shown in Table 1.

Also, the load (linear pressure) when breakage occurred was calculated from the following formula. The results are shown together in Table 1.

Linear pressure=Load $(P)$/(Elastic body width $(W1)$ *2)

Examples 2 to 7

For Examples 2 to 4 and 6, the precursor sheet and the elastic roll were respectively prepared in the same manner as in Example 1, except that the elastic body with the compression Young's modulus shown in Table 1 was used. Also, for Examples 5 and 7, the precursor sheet and the elastic roll were respectively prepared in the same manner as in Example 1, except that the elastic body with the compression Young's modulus shown in Table 1 was used, and the thickness of the elastic body was changed to 1 mm. By using the prepared precursor sheets and elastic rolls, the breaking limit elongation and the load when breakage occurred were respectively calculated in the same manner as in Example 1. The results are shown in Table 1.

Comparative Example 1

A precursor sheet was prepared in the same manner as in Example 1. Regarding the uncoated part of this precursor sheet, the breaking limit elongation when just tensile force was applied, was obtained as follows. The results are shown in Table 2.

The uncoated part (aluminum foil) was punched out from the precursor sheet, and a tensile test was conducted by an autograph. The breaking limit elongation $\varepsilon_{max}$ of the aluminum foil was obtained from the following formula:

Breaking limit elongation $\varepsilon_{max}$=(elongation $\varepsilon_A$ when breakage occurred)−(spring back amount $\varepsilon_B$ of 1.0% deformation).

Figure 7A:
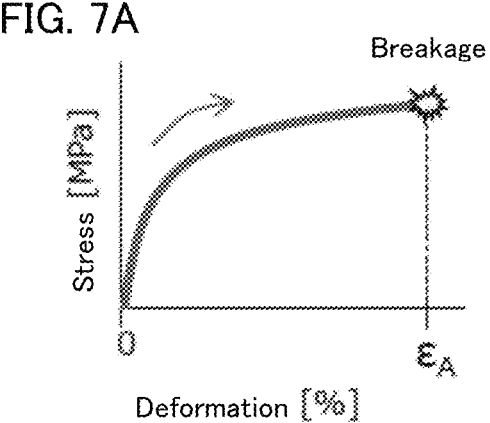
FIGS. 7A and 7B are drawings explaining the breaking limit elongations in Examples and Comparative Examples.
Figure 7B:
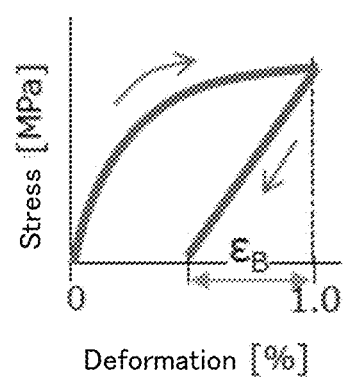

Incidentally, as shown in FIG. 7A and FIG. 7B, $\varepsilon_A$ is the deformation (%) when breakage occurred, and $\varepsilon_B$ is the spring back amount (%) from 1.0% deformation.

Comparative Example 2

The breaking limit elongation and the load when breakage occurred were calculated in the same manner as in Example 1, except that a roll made of metal was used instead of the elastic roll. The results are shown in Table 2.

TABLE 1

| Stretching method | Ex. 1 Elastic roll | Ex. 2 Elastic roll | Ex. 3 Elastic roll | Ex. 4 Elastic roll | Ex. 5 Elastic roll | Ex. 6 Elastic roll | Ex. 7 Elastic roll |
|---|---|---|---|---|---|---|---|
| Compression Young's modulus [MPa] | 11.1 | 17.3 | 19.6 | 24.6 | 24.6 | 31.9 | 86.1 |
| Shaft body diameter [mm] | 50 | 50 | 50 | 50 | 50 | 50 | 50 |
| Elastic body thickness [mm] | 10 | 10 | 10 | 10 | 1 | 10 | 1 |
| Conveying speed [m/min] | 10 | 10 | 10 | 10 | 10 | 10 | 10 |
| Load when breakage occurred [kgf/cm] | 2.1 | 5.3 | 9.0 | 14.4 | 1.5 | 24.9 | 36 |
| Breaking limit elongation [%] | 1.5 | 1.5 | 1.8 | 2.1 | 2.1 | 3.8 | 15.8 |

TABLE 2

| Stretching method | Comp. Ex. 1 Tensile | Comp. Ex. 2 Metal roll |
|---|---|---|
| Compression Young's modulus [MPa] | — | 193000 |
| Shaft body diameter [mm] | — | 50 |
| Elastic body thickness [mm] | — | — |
| Conveying speed [m/min] | — | 10 |
| Load when breakage occurred [kgf/cm] | — | 200 |
| Breaking limit elongation [%] | 1.0 | 0.1 |

Figure 8:
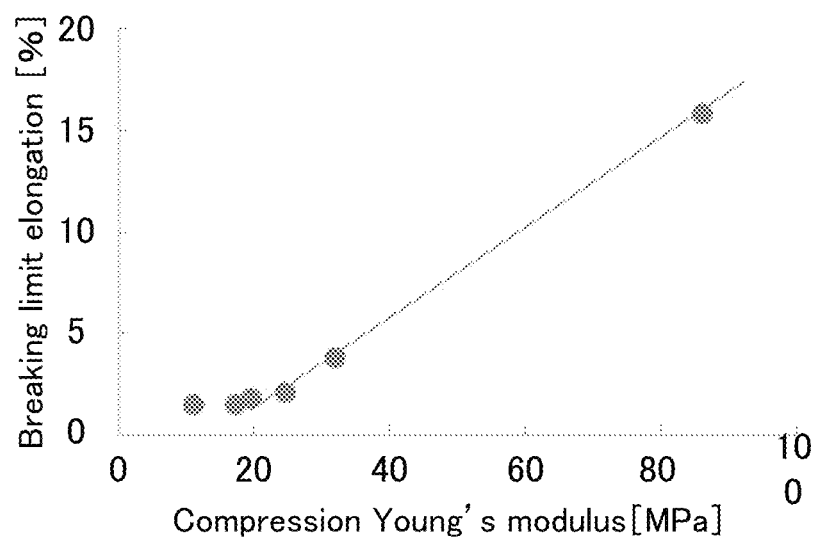
FIG. 8 is a graph showing the relationship between the compression Young's modulus and the breaking limit elongation in Examples.

As shown in Table 1 and Table 2, the breaking limit elongation of Examples 1 to 7 improved compared to Comparative Example 1. From this result, it was confirmed that the breakage of the uncoated part was inhibited more when both the deformation force and the compression force were applied to the uncoated part by the elastic roll, compared to when just the tensile force was applied. Also, from Examples 1 to 7 and FIG. 8, it was confirmed that the larger the compression Young's modulus of the elastic roll was, the more the breaking limit elongation increased, which means that the effect of inhibiting breakage of the uncoated part was high. On the other hand, from Comparative Example 2, when the metal roll with large compression Young's modulus was used, the uncoated part scarcely stretched, but breakage occurred. This is presumably because the metal roll scarcely deformed and sufficient deformation force was not applied to the uncoated part. Also, from Examples 4 and 5, the breaking limit elongation did not change even when the thickness of the elastic body was changed.

Reference Examples 1 and 11

Figure 9:
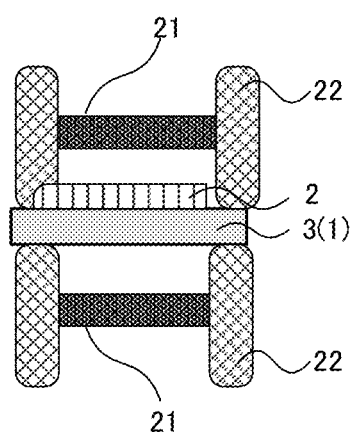
FIG. 9 is a drawing explaining Reference Examples.

An elastic roll of which elastic body's thickness was adjusted to the value shown in Table 3 was respectively prepared. Also, a precursor sheet of which coated part's thickness was adjusted to the value shown in Table 3 was respectively prepared. By using these elastic rolls and precursor sheets, roll pressing was performed so that the elastic roll mounted onto the coated part, as shown in FIG. 9. After pressing, presence or absence of occurrence of breakage (mount-on breakage) in the electrode sheet was confirmed. The results are shown in Table 3. Incidentally, roll pressing was performed by applying compression force that gave the uncoated part 2% stretch amount. Also, as the elastic roll, an elastic body having the Young's modulus of 19.6 MPa was used.

TABLE 3

|  | Elastic body thickness [mm] | Coated part thickness [mm] | Rate of Elastic body thickness/Coated part thickness | Mount-on breakage |
|---|---|---|---|---|
| Ref. Ex. 1 | 10 | 0.3 | 33.3 | Absent |
| Ref. Ex. 2 | 10 | 0.5 | 20.0 | Absent |
| Ref. Ex. 3 | 10 | 0.6 | 16.7 | Absent |
| Ref. Ex. 4 | 5 | 0.3 | 16.7 | Absent |
| Ref. Ex. 5 | 5 | 0.5 | 10.0 | Absent |
| Ref. Ex. 6 | 5 | 0.6 | 8.3 | Absent |
| Ref. Ex. 7 | 2 | 0.3 | 6.7 | Absent |
| Ref. Ex. 8 | 2 | 0.5 | 4.0 | Absent |
| Ref. Ex. 9 | 2 | 0.6 | 3.3 | Present |
| Ref. Ex. 10 | 1 | 0.3 | 3.3 | Present |
| Ref. Ex. 11 | 0.5 | 0.3 | 1.7 | Present |

In the pressing of the uncoated part, the uncoated part is stretched by the deformation force of the elastic body, and thus the specified compression force is applied to the elastic roll, and the load is applied to the elastic body. In that state, when the elastic roll mounts onto the coated part, further load is applied to the elastic body where mounted on, and the deformation force of the elastic body increases. As a result, the mount-on breakage occurs. On the other hand, when the thickness of the elastic body is sufficiently large with respect to the thickness of the coated part, the effect of the load applied when mounted onto the coated part can be decreased, and the influence to the deformation force of the elastic body can be reduced. As a result, the mount-on breakage can be inhibited.

As shown in Table 3, when the thickness of the elastic body was less than 4 times of the thickness of the coated part, mount-on breakage occurred. From the results of Reference Examples, in consideration of the case where the elastic roll meanders and mounts onto the coated part, it was suggested that the thickness of the elastic body with respect to the thickness of the coated part is preferably 4 times or more.

REFERENCE SIGNS LIST

1 metal foil
2 coated part
3 uncoated part
10 precursor sheet
21 shaft body
22 elastic body
20 elastic roll

What is claimed is:

1. A method for producing an electrode, the method comprising:
    a preparing step of preparing a precursor sheet including a metal foil, and a coated part and an uncoated part, arranged on the metal foil;
    a coated part pressing step of pressing the coated part in a thickness direction; and
    an uncoated part pressing step of pressing the uncoated part in the thickness direction, before or after the coated part pressing step; wherein
    the coated part contains an electrode material including at least an active material;
    the uncoated part does not contain the electrode material, and is arranged in an edge of the coated part; and
    in the uncoated part pressing step, the uncoated part is roll-pressed by a pair of elastic rolls arranged in a thickness direction, and is stretched without breakage;
    each elastic roll comprises a shaft body and an elastic body covering the shaft body;
    the uncoated part is pushed by the pair of elastic bodies during the roll pressing;
    a compression Young's modulus of the elastic body is 11.1 MPa or more and 86.1 MPa or less;
    a thickness of the elastic body is 1 mm or more an 10 mm or less;
    an elongation of the uncoated part by the roll pressing is 1.5% or more and 15.8% or less; and
    the uncoated part pressing step is performed while applying a tensile force of 30N or more and 100N or less.

2. The method for producing the electrode according to claim 1, wherein the compression Young's modulus of the elastic body is 20 MPa or more.

3. The method for producing the electrode according to claim 1, wherein, when T1 designates a thickness of the elastic body and T2 designates a thickness of the coated part, T1/T2 is 4 or more and 33.3 or less.

* * * * *